United States Patent [19]

Itomi

[11] Patent Number: 5,074,393
[45] Date of Patent: Dec. 24, 1991

[54] CLUTCH-BEARING ASSEMBLY
[75] Inventor: Shoji Itomi, Mie, Japan
[73] Assignee: NTN Corporation, Osaka, Japan
[21] Appl. No.: 519,990
[22] Filed: May 7, 1990
[30] Foreign Application Priority Data May 19, 1989 [JP] Japan .................. 1-127542

[51] Int. Cl.⁵ .............................. F16D 41/06
[52] U.S. Cl. ..................... 192/45; 384/560
[58] Field of Search ............ 192/45; 384/504, 505, 384/510, 512, 523, 560

[56] References Cited

U.S. PATENT DOCUMENTS 3,913,993 10/1975 Ernst ................. 192/45 X
4,723,851 2/1988 Troster et al. ......... 384/504 X
4,783,182 11/1988 Caron et al. ........... 384/504

FOREIGN PATENT DOCUMENTS 3614558 11/1987 Fed. Rep. of Germany ...... 384/512

Primary Examiner—Rodney H. Bonck
Attorney, Agent, or Firm—Armstrong, Nikaido, Marmelstein, Kubovcik & Murray

[57] ABSTRACT

An integral assembly according to the present invention has a bearing for rotatably supporting a rotary shaft and a one-way clutch for transmitting the rotation of the rotary shaft in one direction only. These members have a single common inner ring. The one-way clutch has a cage integrally formed at one side thereof with a coupling ring engaging in grooves formed in the inner peripheral surfaces of outer rings of both members at their opposed ends to couple the bearing and the clutch together.

2 Claims, 2 Drawing Sheets

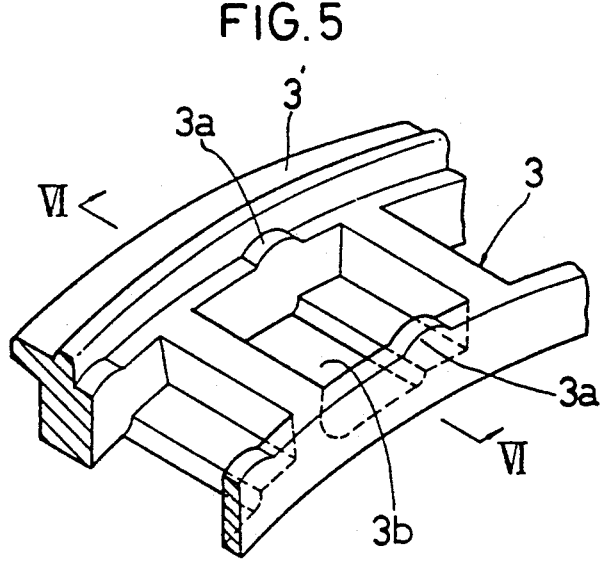
FIG.5
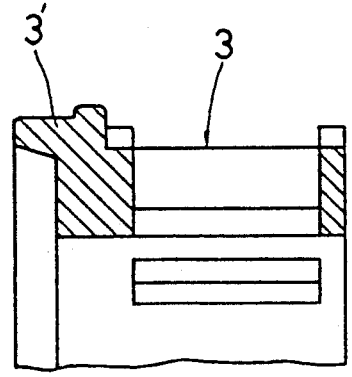
FIG.6
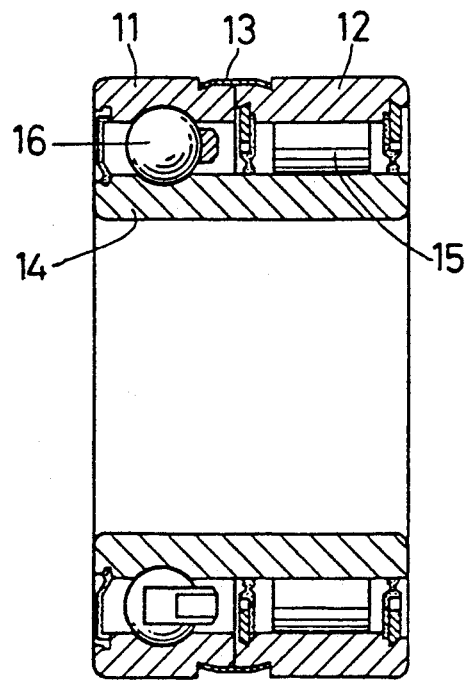
FIG.7 *PRIOR ART*

CLUTCH-BEARING ASSEMBLY

This invention relates to an integral assembly comprising a one-way clutch and a bearing coupled together by a coupling ring integral with a cage for the one-way clutch.

A clutch and a bearing used in various kinds of industrial machines have often been manufactured separately from each other. Machines of a certain type require that they be provided adjacent to each other.

If they are provided so close to each other that they can be coupled together into one unit, they are, in some cases, manufactured separately from each other and installed close to each other as two independent parts. In other cases, they have some of their essential parts integral with each other to form an integral structure as a whole. One example of the latter cases is shown in FIG. 7.

In the example shown in FIG. 7, a bearing and a one-way clutch have their respective outer rings 11 and 12 joined together by means of a joint member 13. An inner ring 14 is a common part. Thus they form an integral assembly as a whole.

But if the bearing and the clutch are made of separate parts from each other, the number of assembling steps in mounting them in a machine will increase. This will lead to an increase in the assembling cost. Also, in such a case, it is necessary to allow for an extra space in the area where the bearing and the clutch are assembled, for easy assembly. This will lead to increase in the mounting space and the material cost.

In the example of FIG. 7, the bearing and the clutch form an integral assembly as a whole. Thus they can be easily mounted in a machine and takes up less space. But in this example, the coupling member 13 engages the outer peripheral surfaces of the outer rings 11 and 12 to couple them together. This tends to increase the number of parts. But it has not been heretofore proposed to reduce the number of parts and simplify the assembly by use of a coupling member integral with a cage.

It is an object of the present invention to provide an integral clutch-bearing assembly in which their outer rings are coupled together and which has a simple structure and can be assembled with a smaller number of parts and less assembling steps.

In accordance with the present invention, there is provided an integral assembly comprising a bearing and a one-way clutch having a common inner ring; the bearing having an outer ring, balls mounted between the outer ring and the inner ring, and a cage for retaining the balls; the one-way clutch having an outer ring, rollers mounted between the outer ring and the inner ring, and a cage for retaining the rollers; the improvement wherein the cage for the one-way clutch is integrally formed on one side thereof with a coupling ring adapted to engage the outer ring of the bearing and the outer ring of the one-way clutch to couple them together.

With the integral clutch-bearing assembly according to the present invention, both members can be coupled together by forcibly press-fitting the coupling ring into the seal or coupling grooves formed in the outer rings of the respective members.

In this case, in coupling both members together, the coupling ring is fitted in the seal groove by utilizing a frictional force or hooking force. In this respect, the coupling ring should have such a sectional shape as to possess the abovementioned frictional force and to snugly fit in the seal groove.

With the integral assembly in which both members are integrally coupled together, since the cage of the one-way clutch and the coupling ring are integral with each other, the bearing and the clutch can be coupled together simply by pushing the outer rings of both members from both sides. This will also serve to reduce the number of parts and thus cost.

Other features and objects of the present invention will become apparent from the following description taken with reference to the accompanying drawings, in which:

FIG. 5 is a perspective view of the other embodiment of the cage;

FIG. 6 is a sectional view taken along line VI—VI of FIG. 5; and

FIG. 7 is a sectional view of a prior art assembly comprising a one-way clutch and a bearing.

Now the embodiments of this invention will be described with reference to the accompanying drawings.

Figure 1:
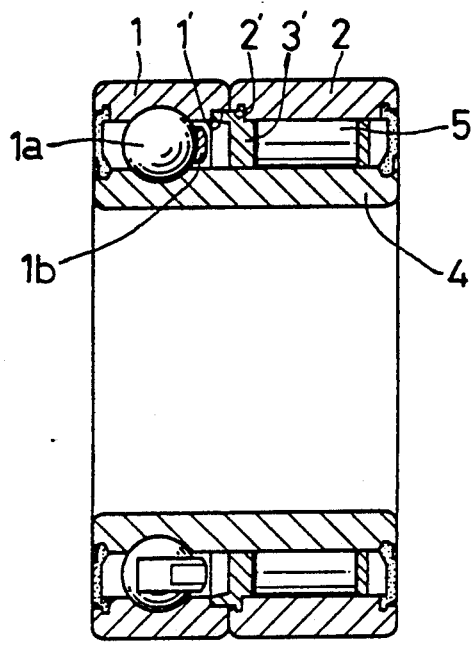
FIG. 1 is a sectional view of the embodiment of the clutch-bearing assembly according to the present invention.
Figure 2:
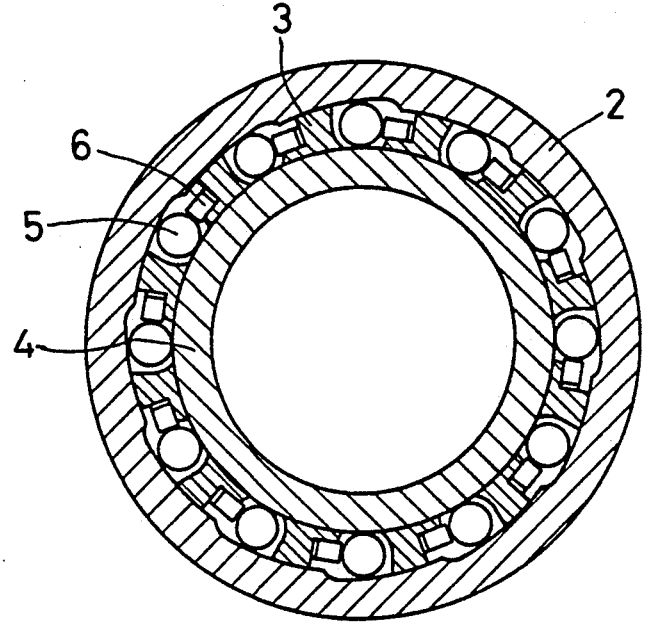
FIG. 2 is side view of the one-way clutch.

As shown in FIGS. 1 and 2, the bearing and the one-way clutch have their respective outer rings 1 and 2 coupled together by means of a coupling ring 3'. The bearing and the one-way clutch have a common inner ring 4. Thus the bearing comprises half of the inner ring 4, the outer ring 1 and balls 1a and a cage 1b held therebetween. The one-way clutch comprises the other half of the inner ring 4, the outer ring 2, rollers 5 held therebetween, springs 6 for urging the rollers 5 and a cage 3 for retaining the rollers 5 and the springs 6. The coupling ring 3' is received in seal grooves 1' and 2' formed in the inner peripheral surfaces of the outer rings 1 and 2 of the bearing and the one-way clutch, respectively.

Figure 3:
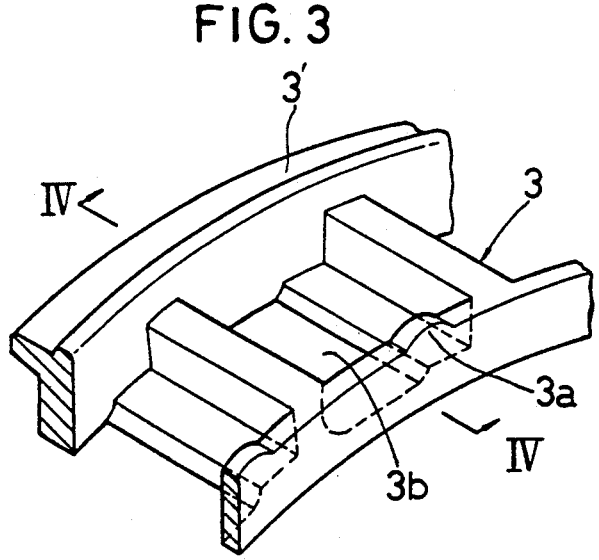
FIG. 3 is a perspective view of the cage of the one-way clutch formed with the coupling ring.
Figure 4:
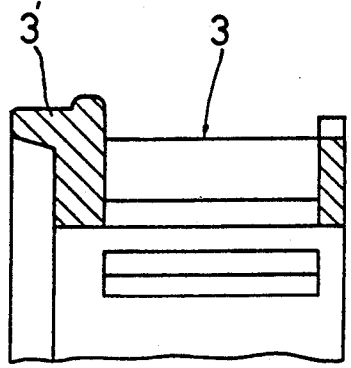
FIG. 4 is a sectional view taken along line IV—IV of FIG. 3.

As shown in FIGS. 3 and 4, the coupling ring 3' is formed on one side of the cage 3 so as to be integral therewith and has an upwardly-protruding inverted L-shaped section. The two outer rings 1 and 2 are coupled together by forcibly thrusting the coupling ring 3' into the seal grooves 1' and 2'. Instead of using the seal grooves, grooves for coupling may be formed.

As shown in FIG. 3, the cage 3 is formed on its top edge at the side remote from the coupling ring 3' with protrusions 3a adapted to come into engagement with a cam surface formed on the outer ring 2 to prevent the cage 3 from turning. Roller retaining spaces 3b defined by the cage 3 are cylindrically shaped to guide the rollers 5 without falling inwardly.

Thus, the one-way clutch and the bearing are coupled together by the coupling ring 3' integral with the cage 3 for the one-way clutch to form an integral assembly. Unlike other conventional assemblies, this assembly requires no special coupling member for coupling the outer rings of the one-way clutch and the bearing. Use of the coupling ring 3' integral with the cage 3 makes it possible to assemble the clutch and the bearing with a minimum number of parts.

The cage 3 integral with the coupling ring 3' is in general made of a resinous or metallic material but may be made of any other material as far as it is capable of coupling the two outer rings together and is suitable as a material for the cage.

If the bearing has a larger external diameter than that of the one-way clutch, the frictional force between the outer periphery of the one-way clutch and the housing will be too low to obtain a sufficient slip torque. Thus the bearing should have an external diameter several micrometers smaller than that of the one-way clutch.

FIGS. 5 and 6 show the other embodiment which differs from the first embodiment in that protrusions 3a for preventing the cage 3 from turning are provided on both side walls thereof. By providing the protrusions 3a on both side walls, their function as a turn stopper is strengthened. The same members as those in the first embodiment are represented by the same numerals.

What is claimed is:

1. An integral assembly comprising a bearing and a one-way clutch having a common inner ring; said bearing having an outer ring, balls mounted between said outer ring and said inner ring, and a cage for retaining said balls; said one-way clutch having an outer ring, rollers mounted between said outer ring and said inner ring, and a cage for retaining said rollers; the improvement wherein said cage for said one-way clutch is integrally formed on one side thereof with a coupling member engaging said outer ring of said bearing and said outer ring of said one-way clutch to couple together said outer rings and said cage during operation of the assembly.

2. An integral assembly as claimed in claim 1, wherein said outer rings are formed in inner peripheries thereof at inner ends thereof with a groove for receiving said coupling member.

* * * * *